3,083,246
POLYMERIZATION OF OLEFINIC HYDROCARBONS

George Holzman, Walnut Creek, and Alfred W. Shaw, Moraga, Calif., assignors to Shell Oil Company, New York, N.Y., a corporation of Delaware
No Drawing. Filed Feb. 9, 1961, Ser. No. 88,014
17 Claims. (Cl. 260—683.15)

This invention relates to the catalytic polymerization of olefinic hydrocarbons and more particularly it relates to the polymerization of selected lower tertiary olefins up to and including $C_{10}$ hydrocarbons. It further relates to selective catalytic polymerization of certain dienes as well as monoolefins which may all be present in a hydrocarbon mixture.

The polymerization of monoolefins and of diolefins to compounds of higher molecular weights is well known. The literature describes many processes and promoters for such polymerization. Moreover, dimerization, as well as extensive polymerization, is also a well-known process amply set forth in text material along with the fact that tertiary olefins are the most readily polymerized. Certain processes for their selective polymerization are already known and described. For example, the anhydrous halides of aluminum, iron, zinc, and boron have been used as polymerization catalysts under suitable conditions. In addition, alcoholic solutions of such halides have been shown to function as polymerization catalysts for tertiary olefins. However, while the art teaches the feasibility and desirability of polymerizing tertiary olefins in a selective manner, there nevertheless still exists the need for substantial improvement in both the selectivity and conversion provided by catalysts in effecting the polymerization of tertiary olefins.

The polymerization of olefinic hydrocarbons is advantageous for several important reasons. Not only are the polymerized products of considerable value, per se, but also the utility and eventual worth of the hydrocarbon stream from which such polymerized materials may be removed is correspondingly enhanced.

It is, therefore, a principal object of the present invention to provide novel catalytic means for selectively polymerizing particular tertiary olefins from mixtures containing the same.

A further important object of the invention is the purification of the hydrocarbon feed stream by the selective removal of tertiary olefins and diolefins therefrom through polymerization thereof. Such removal permits further advantageous processing and eventual use of the hydrocarbon feed streams, while at the same time providing useful polymerized products from such unsaturated materials. A still further object of the invention is in the perfection of a novel supported catalytic material having enhanced activity and propensity for the selective polymerization of tertiary olefinic materials. Yet a further object of the invention is in the provision of a combination of particular catalytically active materials having enhanced properties for effecting desired polymerization. Another object of the invention is the provision of a rapid, relatively inexpensive, controllable polymerization process for tertiary olefins. Other objects and features of advantage will be apparent from a consideration of the following description and claims.

Now, in accordance with the present invention, it has been found that olefins, and especially tertiary olefins, are polymerized by a hexacarbonyl of a metal of the group VIa of the Mendelejeff Periodic Table (Ref.: p. 122—Inorganic Chemistry, Moeller, Wiley, 1952) having an atomic number from 42 to 74, inclusive, i.e., molybdenum and tungsten hexacarbonyls.

A very desirable feature of the invention is the possibility of upgrading the octane value of the eventual product from refinery $C_4$ streams. This is accomplished by the isomerization of butene-1 to butene-2 by the catalyst, while selectively dimerizing isobutylene to diisobutylene. The diisobutylene is hydrogenated to isooctane and butene-2 is alkylated with isobutane to form a high-quality alkylate fuel. In accordance with one embodiment of the invention, a highly aromatic hydrocarbon fuel, such as one containing large proportions of benzene or toluene, can be used as solvent during the catalytic isomerization and selective dimerization, as will be described more fully hereinafter.

The olefins with which the present invention is concerned are particularly tertiary and secondary olefins, and especially tertiary olefins. The olefins may be monoolefins or diolefins; they may be alicyclic, acylic, aryl-substituted alicyclic or aryl-substituted acyclic. Typical tertiary olefins such as isobutylene, 2-methylbutene-1,2-methylbutene-2, 2-methylbutadiene-1,3 (isoprene), 2,5-dimethylhexadiene-1,5, 2,3-dimethylbutene-2, 1-methylcyclopentene-1, dipentene and alpha methylstyrene may be dimerized or polymerized by the use of the metal carbonyls of the invention. Secondary olefins may include, for example, styrene, butadiene-1,3, 3-methyl butene-1, cyclohexene, cyclohexadiene-1,4, phenyl butadienes, and the like. The term "polymerization" as used herein denotes homo and co-polymerization, and also includes dimerization as well as the formation of higher polymers. Tertiary olefins include alicyclic alkenes, acyclic alkenes and aryl alkenes such as alpha-methylstyrene.

The catalytic materials of the present invention comprise effective amounts of tungsten hexacarbonyl $[W(CO)_6]$ or molybdenum hexacarbonyl $[Mo(CO)_6]$, which may be employed separately or in combination, and either supported or unsupported, with particular value being found in a catalytic mass comprising calcined silica gel as supporting medium for one or both of the metal carbonyls. The ratio of hexacarbonyl to supporting medium may vary within relatively wide limits, for example, from 0.01 to 25% w. catalyst, basis support. The calcined silica gel which constitutes a preferred embodiment of the invention is a neutral porous material having a surface area of about 600 m.²/gm., although the surface area of as low as 200 m.²/gm. has been satisfactory. While calcined silica gel is preferred supporting means for the hexacarbonyls, other materials such as, for example, alumina, charcoal, molecular sieve-material such as crystalline zeolites, magnesia, silica-alumina or silicous clays, may be used.

Tungsten hexacarbonyl and molybdenum hexacarbonyl have been found to have specific catalytic properties for the selective polymerization of tertiary olefins. Moreover, these materials exhibit marked activity for double-bond isomerization as well as for olefin polymerization. Such dual catalytic activity is of particular interest in view of the desirability of isomerizing butylene-1 to butylene-2 in an unpolymerized $C_4$ stream in addition to polymerizing isobutylene with consequent removal of the polymerized product.

Tungsten hexacarbonyl and molybdenum hexacarbonyl bonyl or molybdenum hexacarbonyl may be prepared according to known methods. For example, a description of such preparation of metal hexacarbonyls may be found in Handbuch der Preparativen Anorganischen Chemie, George Brauer, Ferd Erbe Verlag, Stuttgart (1954). Moreover, the catalytic material may comprise mixtures of each of the aforementioned hexacarbonyls in varying proportions and the preparation of such composites will follow generally accepted procedures. It has been found that the activity of the hexacarbonyl catalyst for the present purpose is unexpectedly enhanced to a considerable degree by the impregnation of such material onto a suitable support, such as, for a preferred example, calcined silica gel. As illustrative of the unexpected performance of supported carbonyl catalyst as distinguished from unsupported catalyst, it has been found that, while using tungsten hexacarbonyl in a benzene solvent, a 94% conversion was obtained after 70 minutes with unsupported catalyst, whereas approximately the same degree of conversion resulted in only 45 minutes reaction time when the catalytically active mass comprised the same metal carbonyl dispersed on calcined silica gel. The same was true when molybdenum hexacarbonyl was used in diisobutylene solvent, wherein 81% conversion occurred in 160 minutes with unsupported catalyst, the same percent conversion requiring only 52 minutes with the silica gel supported catalyst.

It has been found that the hexacarbonyl catalyst will function in the absence of and in the presence of solvents; the use of a solvent is advantageous in some instances. It will be appreciated that the formation of diisobutylene, which is a useful solvent, may be anticipated where the isobutylene monomer comprises a portion of the feed to the catalytic polymerization zone. Accordingly, diisobutylene as well as mixtures thereof with a substantial amount of product stream including some higher polymers, may be introduced initially as a solvent in connection with the use of either tungsten or molybdenum hexacarbonyl and other solvents to be enumerated hereinafter may also be advantageously employed. For example, with regard to tungsten hexacarbonyl catalyst, it is found that benzene, 1-octene, or cyclohexene are solvents substantially equivalent to diisobutylene, whereas n-hexane is somewhat inferior although acceptable. On the other hand, diisobutylene is considerably superior in conjunction with molybdenum hexacarbonyl while 2-methyl-1-pentene is acceptable although somewhat less desirable, and benzene, 1-octene, cyclohexene, and n-hexene are satisfactory although considerably less effective. Moreover, it will be appreciated that diisobutylene is an excellent solvent for those reactions wherein a combined molybdenum hexacarbonyl-tungsten hexacarbonyl composite catalytic composition is to be used in order to take advantage of the enhanced combination effect resulting therefrom.

The temperature range wherein the polymerization reaction will occur can be expressed within practical ranges as well as by means of a theoretical consideration thereof. It is known that substantial reaction occurs when molybdenum hexacarbonyl is present as catalyst at 100° C. in a solvent-free condition. Under such circumstances 97% conversion was experienced. At 200° C. tungsten hexacarbonyl in benzene solvent provided 94% conversion, and a similar degree of conversion with no solvent present. At 200° C. molybdenum hexacarbonyl provided 96% conversion of feed in the absence of a solvent and 90% conversion wherein diisobutylene was present. Accordingly the theoretical temperature range for the reaction, as well as the amount and type of solvent, if any, may vary within relatively wide limits, particularly from that temperature at which substantial polymerization reaction occurs to that higher temperature whereat catalyst decomposition is excessive. In practical terms this range would be from about 75° C. to 350° C., with the preferred temperature range being from about 100 to 250° C.

It may be postulated that at least a substantial amount of catalytic activity is imparted to the reaction mass through the decomposition of the metal carbonyl into its constituents, to wit, metal plus CO as well as possible other undefined metal compounds. While it appears requisite to shift the reaction of the metal carbonyl toward its decomposition, too rapid or too prolonged catalyst decomposition would obviously be disadvantageous for several reasons. Accordingly, it is contemplated that one means for controlling catalyst decomposition and the catalytic activity inherent therewith, is by regulating the pressure of the CO in the system. As CO pressure increases, catalyst activity will decrease while temperature is held constant. However, it may be advantageous to operate at higher temperatures with accompanying higher reaction rates and this may be accomplished by providing increased CO pressure, thereby preventing, to at least some degree, the decomposition of the catalytic material. Accordingly, it will be seen that an important relationship exists between temperature and CO-pressure in the system. Those temperature ranges recited hereinbefore are critical wherein no additional CO-pressure is provided.

The amount of catalyst required in the polymerization of hydrocarbon materials containing a tertiary olefin may vary within relatively wide limits. For example, it has been found that a ratio of tertiary olefin feed to catalyst may range from 1000:1 to 20:1. In other words, only a relatively small amount of catalyst is required for rapid polymerization.

The catalytic effect of the metal carbonyls described herein is especially applicable to the polymerization of tertiary olefin hydrocarbons. However, in addition to the polymerization of tertiary olefins, unbranched olefins may be polymerized but at a slower rate. Moreover, copolymerization of a non-tertiary olefin with a tertiary olefin is contemplated within the scope of the invention although the rate of polymerization may be considerably lower, dependent on the processing conditions. In fact, certain cyclic compounds such as, for example, cyclopentene or cyclohexene, may undergo copolymerization under appropriate circumstances. The hydrocarbons need not be limited to monoolefins but may include diolefins as well, provided that such diolefins contain a tertiary olefinic bond. Furthermore, in the case of diolefins the product may contain the tertiary olefin group intact but even so its presence in the monomer seems to be a significant factor in the rate and extent of polymerization. For example, it has been found that isoprene may be converted to an extent of 90% over molybdenum hexacarbonyl at a temperature of from 100 to 119° C. and at a time of about 19 hours to a rubbery polymer which has the following analysis: 75% 3,4-polyisoprene, 20% cis-1,4-polyisoprene, and 5% trans-1,4- and 1,2-polyisoprene. Moreover, when the temperature was raised to 175° C. a similar 90% conversion to a polymer having the same composition was accomplished after only 1.5 hours of reaction. On the other hand, in the case wherein 1,3-butadiene was fed into the polymerization reactor in lieu of isoprene, the reaction was considerably less. Only 20% conversion resulted, giving a product consisting of one-third liquid and two-thirds solid polymer. The liquid polymer was largely vinyl cyclohexene, which normally results from thermal dimerization rather than through any catalytic activity.

The solid polymer material consisted of 32% cis-1,4-polybutadiene, 15% trans-1,4-polybutadiene, and 53% 1,2-polybutadiene, again demonstrating that the catalyst exerts steric control on the polymerizing monomer.

The invention contemplates, as an important feature thereof, a novel catalytic material which imparts steric control to catalytic polymerization. For example, no catalyst in the presently known art provides for the manufacture of the rubbery isoprene polymer having the composition set forth hereinbefore, containing over 60% 3,4-polyisoprene, and especially at the same time over 50% and up to 80% of the remainder being cis-1,4-polyisoprene.

As long as a tertiary olefin linkage is present in the hydrocarbon feed, polymerization thereof may be anticipated so long as the other controlled reaction variables are maintained at proper levels. The invention contemplates the dimerization, and in certain instances more extensive polymerization of hydrocarbon materials having tertiary olefin linkages and within the $C_4$ to $C_{10}$ range. As has been set forth hereinbefore, the dimerization of isobutylene to diisobutylene is of particular significance, as well as the polymerization and molecular rearrangement of isoamylene, as will be apparent from a consideration of Table I and Table II, respectively.

TABLE I
*Polymerization of Isobutylene*

| | |
|---|---|
| Charge, grams: | |
|   Isobutylene | 16.0 |
|   Benzene (solvent) | 21.2 |
|   $W(CO)_6$ | 0.028 |
| Conditions: | |
|   Temperature, °C | 202 |
|   Pressure, p.s.i.g. max | 400 |
|   Time, min | 70 |
| Conversion of isobutylene, percent | 94.4 |
| Products, percent w. basis hydrocarbons charged (no-loss basis): | |
|   Isobutylene | 2.4 |
|   Benzene | 53.9 |
|   $C_8$ hydrocarbons | 23.5 |
|   $C_{12}$ hydrocarbons | 18.3 |
|   Other hydrocarbons | 1.6 |
|   Residue (organic) | 0.3 |

TABLE II
*Polymerization of Isoamylene*

| | |
|---|---|
| Charge, grams: | |
|   2-methyl-1-butene | 20.2 |
|   Benzene (solvent) | 20.4 |
|   $W(CO)_6$ | 0.099 |
| Conditions: | |
|   Temperature, °C | 205 |
|   Pressure, p.s.i.g. max | 280 |
|   Time, min | 150 |
| Conversion of 2-methyl-1-butene, percent | 86.1 |
| Products, percent w. basis hydrocarbons charged (no-loss basis): | |
|   Isopentane | 0.3 |
|   3-methyl-1-butene | 0.5 |
|   2-methyl-1-butene | 7.0 |
|   2-methyl-2-butene | 25.1 |
|   Benzene | 49.7 |
|   $C_8$–$C_9$ hydrocarbons | 1.3 |
|   $C_{10}$ hydrocarbons | 15.8 |
|   Residue (organic) | 0.3 |

The invention contemplates certain types of copolymerization such as, for example, polymerization of isobutylene with butadiene, even though the polymerization of relatively pure butadiene is relatively slow in the absence of its having any tertiary olefinic bond. In addition, copolymerization of tertiary olefins, such as isobutylene, with higher olefins in cracked petroleum streams containing olefins in the $C_5$ and higher range is of interest for production of high octane number isoparaffins by hydrogenation of the polymer. While certain materials in the specified hydrocarbon range and having tertiary olefinic bonds will suggest themselves to those skilled in the art, the following are of special significance with regard to their polymerization possibilities. These include, in addition to isobutylene, isoamylene, methylcyclopentene, methylcyclohexene and the like. While the invention contemplates reactions in the vapor phase, it is not completely understood whether the catalytic material to be used functions therein in a truly homogeneous or in a heterogeneous fashion. In view of the fact that supporting media enhance the catalytic activity of the metal hexacarbonyls, it is now believed that heterogeneous catalysis occurs along with a reaction in an otherwise homogeneous system.

The following examples are presented for purposes of explanation and it is not intended to limit the broader aspects of the invention to the exact details as set forth therein.

EXAMPLE I

A cracked refinery $C_4$ feed stream containing major and minor amounts of paraffinic, olefinic, and other organic material generally present therein and specifically including isobutylene and butene-1 is fed into a catalytic reaction zone containing tungsten hexacarbonyl of about 0.1% w. based on the isobutylene available for polymerization. The temperature in the reaction zone is maintained at about 200° C. for a contact time of about two hours. A substantial amount of butene-1 is isomerized to butene-2 with 94% of isobutylene being converted to the dimer. Following separation from the other materials, the butene is alkylated with isobutane in the presence of conventional HF catalyst to high-quality fuel enriched in butene-2 alkylate. The $C_8$ fraction, consisting essentially of 2,4,4-trimethyl-1-pentene and 2,4,4-trimethyl-2-pentene, is hydrogenated over conventional catalyst such as platinum or palladium to a mixture of stable, high-octane number $C_8$ hydrocarbons.

EXAMPLE II

A hydrocarbon stream containing $C_4$ through $C_{10}$ hydrocarbons, and in particular containing isobutylene along with minor amounts of other hydrocarbons having tertiary olefinic bonding, is passed into a catalytic polymerization zone wherein molybdenum hexacarbonyl is present in an amount of about 0.15% w. based on the amount of available tertiary olefin in the feed. The temperature is maintained at about 200° C. for a time of about three hours with the result that 96% of the isobutylene and other tertiary olefinic materials is converted, diisobutylene being the chief product along with minor amounts of higher hydrocarbons.

EXAMPLE III

A stream similar to that described in Example II is fed into the reaction zone wherein benzene solvent is provided in appreciable amounts and tungsten hexacarbonyl is present as catalyst. Under similar conditions of temperature and catalyst concentration as in Example II, the conversion of the tertiary olefinic material was 94%.

EXAMPLE IV

A stream similar to that set forth in Example II is fed to the reaction zone wherein molybdenum hexacarbonyl is present as catalyst and an appreciable amount of diisobutylene is provided as solvent. With the concentration as well as the temperature being similar to that in Example II, 90% conversion of the tertiary olefinic material is accomplished.

EXAMPLE V

The process of Example II is carried out in the presence of a catalyst comprising a mixture of tungsten hexacarbonyl with molybdenum hexacarbonyl with the result that 90% conversion occurs. The $W(CO)_6/Mo(CO)_6$ weight ratio is, for purposes of this example, 1/1.

EXAMPLE VI

A catalytic material comprising tungsten hexacarbonyl on a calcined silica gel supporting medium is prepared by dissolving 30 mg. of the metal carbonyl in benzene. 3 gms. of calcined silica gel is added to the solution and the mixture heated with agitation to a temperature of about 200° C. and then used in the catalytic reaction.

A feed stream comprising 16.3 gm. of isobutylene and 20 gm. of benzene as solvent is fed into a reaction zone wherein 3.2 gm. of the supported catalytic material comprising 1% $W(CO)_6$ by weight on the silica gel is present. At a temperature of 200° C. in the presence of a benzene solvent, 88% of the isobutylene is dimerized in 45 minutes. A similar procedure using tungsten hexacarbonyl catalyst without support but in the presence of benzene solvent requires 70 minutes to accomplish a similar degree of conversion.

EXAMPLE VII

A catalytic material comprising molybdenum hexacarbonyl supported on calcined silica gel is prepared similarly to the material in Example VI.

Using an isobutylene-rich feed and diisobutylene solvent, 52 minutes are required for 80% dimerization, whereas 160 minutes are required when molybdenum hexacarbonyl is employed without a silica gel support.

Other modifications and advantageous adaptations of the catalytic material and polymerization process of the invention will suggest themselves to those skilled in the art of hydrocarbon technology, and the invention is not to be limited to the details as set forth hereinbefore but only by the spirit and scope of the appended claims. For example, the range of catalyst concentration is not believed to be particularly critical but it has been found that as little as 50 parts per million of catalyst to reactants is sometimes sufficient for reactivity and as much as 30,000 parts per million are acceptable although the upper limit is largely dependent on practical considerations.

We claim as our invention:

1. Process for the polymerization of a hydrocarbon having from 1 to 2 olefinic bonds which comprises contacting said hydrocarbon with a catalytically active amount of a group VIb metal hexacarbonyl selected from the group consisting of molybdenum hexacarbonyl and tungsten hexacarbonyl at a temperature within the range of from 75 to 350° C. to polymerize said hydrocarbon.

2. Process in accordance with claim 1 wherein said hydrocarbon is a tertiary olefin having from 4 to 10 carbon atoms.

3. Process in accordance with claim 1 wherein said metal hexacarbonyl is molybdenum hexacarbonyl.

4. Process in accordance with claim 1 wherein said metal hexacarbonyl is tungsten hexacarbonyl.

5. Process in accordance with claim 1 wherein said hydrocarbon comprises isobutylene.

6. Process in accordance with claim 1 wherein said hydrocarbon comprises isoprene.

7. Process in accordance with claim 1 wherein the metal hexacarbonyl is present in the form of a supported catalytically active mass.

8. Process in accordance with claim 6 wherein said catalytically active mass comprises metal hexacarbonyl supported on silica gel.

9. Process in accordance with claim 1 wherein the polymerization is carried out in the presence of a hydrocarbon solvent selected from the group consisting of diisobutylene, benzene, octene, cyclohexene, methyl pentene, and n-hexane.

10. Process in accordance with claim 9 wherein said solvent is diisobutylene.

11. Process in accordance with claim 10 wherein the temperature is maintained at about 200° C.

12. Process in accordance with claim 1 wherein the rate of catalytic reaction is controlled by varying the partial pressure of carbon monoxide in the reaction zone.

13. Process in accordance with claim 1 wherein the catalyst comprises a mixture of tungsten hexacarbonyl with molybdenum hexacarbonyl.

14. Process in accordance with claim 1 wherein the catalyst is present in an amount of at least 50 p.p.m.

15. Process for the copolymerization of a mixture of monomeric olefinic hydrocarbons having from 1 to 2 olefinic bonds and wherein one of the monomers has a tertiary olefinic bond, which comprises contacting said mixture with a catalytically active amount of a group VIb metal hexacarbonyl selected from the group consisting of molybdenum hexacarbonyl and tungsten hexacarbonyl at a temperature within the range of from 75 to 350° C. to polymerize the olefinic hydrocarbon feed.

16. As a new composition of matter catalytically active for the selective polymerization of tertiary olefinic hydrocarbons, molybdenum hexacarbonyl supported on calcined silica gel.

17. As a new composition of matter catalytically active for the selective polymerization of tertiary olefinic hydrocarbons, tungsten hexacarbonyl supported on calcined silica gel.

References Cited in the file of this patent

Fischer et al.: "Chemical Abstracts," volume 53, 1959, pages 21 and 341.

Notice of Adverse Decision in Interference

In Interference No. 94,783 involving Patent No. 3,083,246, G. Holzman and A. W. Shaw, POLYMERIZATION OF OLEFINIC HYDROCARBONS, final judgment adverse to the patentees was rendered Mar. 15, 1968, as to claims 1–5, 7, 14, 16 and 17.

[*Official Gazette August 20, 1968.*]